(12) United States Patent
Yuan et al.

(10) Patent No.: US 8,146,153 B2
(45) Date of Patent: Mar. 27, 2012

(54) METHOD AND SYSTEM FOR CREATING AND ACCESSING A SECURE STORAGE AREA IN A NON-VOLATILE MEMORY CARD

(75) Inventors: Po Yuan, Milpitas, CA (US); Javier Cañis Robles, Madrid (ES); Mei Yan, Cupertino, CA (US); Fabrice Jogand-Coulomb, San Carlos, CA (US); Ahmet Altay, Mountain View, CA (US); Bahman Qawami, San Jose, CA (US); Patricia Dwyer, San Carlos, CA (US); Robert Chin-Tse Chang, Danville, CA (US); Oktay Rasizade, Castro Valley, CA (US); Farshid Sabet-Sharghi, Los Altos Hills, CA (US)

(73) Assignee: Sandisk Technologies Inc., Plano, TX (US)

( * ) Notice: Subject to any disclaimer, the term of this patent is extended or adjusted under 35 U.S.C. 154(b) by 987 days.

(21) Appl. No.: 11/967,641

(22) Filed: Dec. 31, 2007

(65) Prior Publication Data

US 2009/0172809 A1  Jul. 2, 2009

(51) Int. Cl.
*G06F 21/00* (2006.01)
*H04M 1/66* (2006.01)
(52) U.S. Cl. ............... 726/19; 726/5; 726/29; 713/193; 455/410; 379/433.09
(58) Field of Classification Search .............. 726/19
See application file for complete search history.

(56) References Cited

U.S. PATENT DOCUMENTS 5,418,837 A  5/1995 Johansson et al.
(Continued)

FOREIGN PATENT DOCUMENTS

| EP | 1280149 A2 | 1/2003 |
|---|---|---|
| WO | WO 2007/068263 A1 | 6/2007 |
| WO | WO 2008/060467 A2 | 5/2008 |
| WO | WO 2008/080431 A1 | 7/2008 |
| WO | WO 2009/070430 A2 | 6/2009 |

OTHER PUBLICATIONS

Messerges et al., "Digital Rights Management in a 3G Mobile Phone and Beyond," Oct. 27, 2003, DRM '03, pp. 27-38.*

(Continued)

*Primary Examiner* — Taghi Arani
*Assistant Examiner* — Thaddeus Plecha
(74) *Attorney, Agent, or Firm* — Brinks Hofer Gilson & Lione

(57) ABSTRACT

In order to create and access a secure storage account in a non-volatile memory device, an account identification value is calculated. A memory identification value is read from a first non-volatile memory device. The memory identification value and the account identification value are transmitted to a second non-volatile memory device, and a calculated credential is received. A command is transmitted to create a secure storage account in the first non-volatile memory device, where the command contains the credential and the account identification value. To access the account, a sequence is transmitted, containing the account identification value and a value based on the credential. A secure storage system contains a first non-volatile memory device that stores a memory identification value and contains a secure partition accessible using a credential, a second non-volatile memory device that can compute the credential, and a host adapted to create and access the secure partition.

63 Claims, 6 Drawing Sheets

U.S. PATENT DOCUMENTS

| | | | |
|---|---|---|---|
| 7,000,111 B1 * | 2/2006 | Dent et al. | 713/174 |
| 7,036,020 B2 | 4/2006 | Thibadeau | |
| 7,058,818 B2 | 6/2006 | Dariel | |
| 7,215,771 B1 | 5/2007 | Hamlin | |
| 7,426,747 B2 | 9/2008 | Thibadeau | |
| 7,493,656 B2 | 2/2009 | Goodwill et al. | |
| 2003/0046564 A1 * | 3/2003 | Masuda et al. | 713/193 |
| 2004/0067772 A1 | 4/2004 | Gaumain | |
| 2004/0078586 A1 * | 4/2004 | Sato et al. | 713/193 |
| 2004/0162105 A1 | 8/2004 | Reddy et al. | |
| 2005/0026595 A1 | 2/2005 | Huckins | |
| 2005/0287987 A1 * | 12/2005 | Yamamoto | 455/410 |
| 2006/0116969 A1 * | 6/2006 | Hatanaka et al. | 705/71 |
| 2006/0242068 A1 | 10/2006 | Jogand-Coulomb et al. | |
| 2007/0043667 A1 | 2/2007 | Qawami et al. | |
| 2007/0136509 A1 | 6/2007 | Agami | |
| 2007/0218945 A1 | 9/2007 | Agami et al. | |
| 2007/0259691 A1 | 11/2007 | Garcia | |
| 2008/0010450 A1 | 1/2008 | Holtzman et al. | |
| 2008/0020798 A1 * | 1/2008 | Jang et al. | 455/558 |
| 2008/0162947 A1 | 7/2008 | Holtzman et al. | |
| 2008/0163336 A1 | 7/2008 | Feng et al. | |
| 2010/0048169 A1 | 2/2010 | Yan et al. | |
| 2010/0050241 A1 | 2/2010 | Yan et al. | |

OTHER PUBLICATIONS

U.S. Appl. No. 11/557,028, filed Nov. 6, 2006 entitled "Content Control Method Using Certificate Chains".

U.S. Appl. No. 12/229,090 entitled, "Memory Device Upgrade", filed Aug. 20, 2008, 70 pages.

U.S. Appl. No. 12/229,165 entitled, "Accessing Memory Device Content Using a Network", filed Aug. 20, 2008, 44 pages.

Announcement Open Mobile Alliance: DRM Architecture—Candidate Version 2.0, dated Jul. 15, 2004 (24 pages).

Nonfinal Office Action issued in U.S. Appl. No. 12/229,090, mailed Jun. 16, 2011 (13 pages).

International Search Report issued in International Application No. PCT/US2009/054015, mailed on Mar. 5, 2010 (9 pages).

International Preliminary Report on Patentability issued in International Application No. PCT/US2009/054015, mailed Mar. 3, 2011 (12 pages).

Written Opinion issued in International Application No. PCT/US2009/054015, mailed on Mar. 5, 2010 (12 pages).

* cited by examiner

METHOD AND SYSTEM FOR CREATING AND ACCESSING A SECURE STORAGE AREA IN A NON-VOLATILE MEMORY CARD

TECHNICAL FIELD

This application relates generally to the operation of non-volatile flash memory systems, and, more specifically, to a method and system for creating and accessing a secure storage area in a non-volatile memory card.

BACKGROUND

There are many commercially successful non-volatile memory products being used today, particularly in the form of small form factor cards, which employ flash EEPROM (Electrically Erasable and Programmable Read Only Memory) cells formed on one or more integrated circuit devices. Some of the commercially available card formats include Smart Cards, Subscriber Identity Module (SIM), and Removable User Identity Module (R-UIM) cards. These cards typically contain memory and a microcontroller (with associated logic memory and software). The data stored within a card is accessed via an interface that is controlled by a program and, in some cases, security hardware or software.

Typically, SIM cards and R-UIM cards are utilized in cellular telephones operating on Global System for Mobile communication (GSM) and Code Division Multiple Access (CDMA) networks, respectively. In these applications, SIM and R-UIM cards store limited amounts of information, such as encryption keys, subscriber identification values, and telephone contact lists. However, as the storage density of non-volatile memory has increased, more non-volatile memory may be contained within a storage card such as a SIM card. The additional storage may be utilized for a variety of advanced mobile services, such as storing Multimedia Messaging Service (MMS) object attachments, MP3 audio files, high-resolution images files, and video files, as well as providing full personal information management (PIM) functionality, such as e-mail contact lists and calendars. A Mobile Network Operator (MNO) may provide or sell digital content, such as video, picture, and audio files, which may be stored in the additional storage space of a high-capacity card. An example of a high-capacity SIM card is the SIM 5000™, a memory device from SanDisk Corporation of Milpitas, Calif.

The greater storage capacity of a high-capacity SIM card necessitates a faster interface to access the storage contents. The ISO 7816 interface utilized on a typical SIM card, or R-UIM card may be supplemented with an additional high speed interface, such as a Multimedia Card (MMC) interface, a Secure Digital (SD) interface, a Universal Serial Bus (USB), or a Serial Advanced Technology Attachment (SATA) interface, in order to access the storage space of high-capacity cards. The relatively slower ISO 7816 interface may still be utilized for backwards-compatibility purposes, or to control the storage accessible over the high-speed interface. An MNO may utilize the security features of a high-capacity SIM or R-UIM card to prevent copying of the content downloaded by or sold to a cellular telephone subscriber, or to prevent access to the content by unauthorized users or applications.

Some cellular telephones may access a SIM or R-UIM card over an ISO 7816 interface, but may not be capable of utilizing the additional storage space of high-capacity SIM or R-UIM card. Other cellular telephones may support additional storage by providing a receptacle for an additional non-volatile memory card, such as a CompactFlash (CF) card, a MultiMedia Card (MMC), a Secure Digital (SD) card, or a USB Flash Drive. However, an MNO may not be able to prevent copying or unauthorized access to content downloaded or sold to a cellular telephone subscriber that is stored on the additional card, because the additional card may not contain the security features of a high-capacity SIM or R-UIM card.

SUMMARY

In order to address these issues, there is a need for a method to limit access to digital content stored on one non-volatile memory device by utilizing security credentials calculated using a second non-volatile memory device. There is also a need for a system that can securely store and access digital content on one non-volatile memory device, using security credentials calculated using a second non-volatile memory device.

Thus, according to one embodiment, there is a method for creating a secure storage account to permit access to protected content in a non-volatile memory device. In this embodiment, an account identification value is calculated. A memory identification value is read from a first non-volatile memory device. The memory identification value and the account identification value are transmitted to a second non-volatile memory device. A credential is received from the second non-volatile memory device, where the credential is calculated using the memory identification value, the account identification value, and a formula. A command is transmitted to create a secure storage account in the first non-volatile memory device, where the command contains the credential and the account identification value.

In another embodiment, a method of accessing a secure storage account in a non-volatile memory device is provided. In this embodiment, an account identification value is calculated. A memory identification value is read from the first non-volatile memory device. The memory identification value and the account identification value are transmitted to a second non-volatile memory device. A credential is received from the second non-volatile memory device, where the credential is calculated using the memory identification value, the account identification value, and a formula. An account access sequence is performed. The account access sequence consists of transmitting a command containing the account identification value and a value based on the credential.

According to another embodiment, there is a secure storage system. In this embodiment, the storage system includes a first non-volatile memory device that contains a non-volatile memory adapted to store a memory identification value, and further adapted to limit access to a portion of the non-volatile memory using a credential. The storage system also contains a second non-volatile memory device adapted to compute the credential using the memory identification value. The storage system further includes a host adapted to associate the credential with the portion of the non-volatile memory within the first non-volatile memory device, and further adapted to use the credential to obtain read and write access permission to the limited access portion of the non-volatile memory within the first non-volatile memory device.

In yet another embodiment, a host is provided. In this embodiment, the host contains a first communication interface adapted to communicate with a first non-volatile memory device, a second communication interface adapted to communicate with a second non-volatile memory device, and a processor in communication with the first and second communication interfaces. In this embodiment, the processor is configured to calculate an account identification value, and read a memory identification value from the first non-volatile memory device. The processor is also configured to transmit the memory identification value and the account identification value to the second non-volatile memory device, and receive a credential from the second non-volatile memory device, where the credential is calculated using the memory identification value, the account identification value, and a formula. In this embodiment, the processor is further configured to transmit a command to create a secure storage account in the first non-volatile memory device, where the command contains the credential and the account identification value.

According to yet another embodiment, a host is provided. In this embodiment, the host contains a first communication interface adapted to communicate with a first non-volatile memory device, a second communication interface adapted to communicate with a second non-volatile memory device, and a processor in communication with the first and second communication interfaces. In this embodiment, the processor is configured to calculate an account identification value, read a memory identification value from the first non-volatile memory device, and transmit the memory identification value and the account identification value to the second non-volatile memory device. The processor is also configured to receive a credential from the second non-volatile memory device, where the credential is calculated using the memory identification value, the account identification value, and a formula. In this embodiment, the processor is further configured to perform an account access sequence that involves transmitting a command containing the account identification value and a value based on the credential.

Other methods, systems, features, and advantages of the invention will be, or will become, apparent to one with skill in the art upon examination of the following figures and detailed description. It is intended that all such additional methods, systems, features and advantages be included within this description.

BRIEF DESCRIPTION OF THE DRAWINGS

The components in the figures are not necessarily to scale, emphasis instead being placed upon illustrating the principle aspects of various embodiments of the system and method. Moreover, in the figures, like referenced numerals designate corresponding parts throughout the different views.

DETAILED DESCRIPTION OF THE PRESENTLY PREFERRED EMBODIMENTS

An exemplary secure storage system may comprise a host, and a non-volatile memory device, such as a non-volatile memory card. The contents of a non-volatile memory card, such as files or storage partitions within the card, may be associated with a plurality of storage accounts. Each account may have its own account identification value, and each account may have a credential that may be utilized to control access to the account. One or more files, or a partition within a non-volatile memory card, may be associated with an account.

Figure 1:
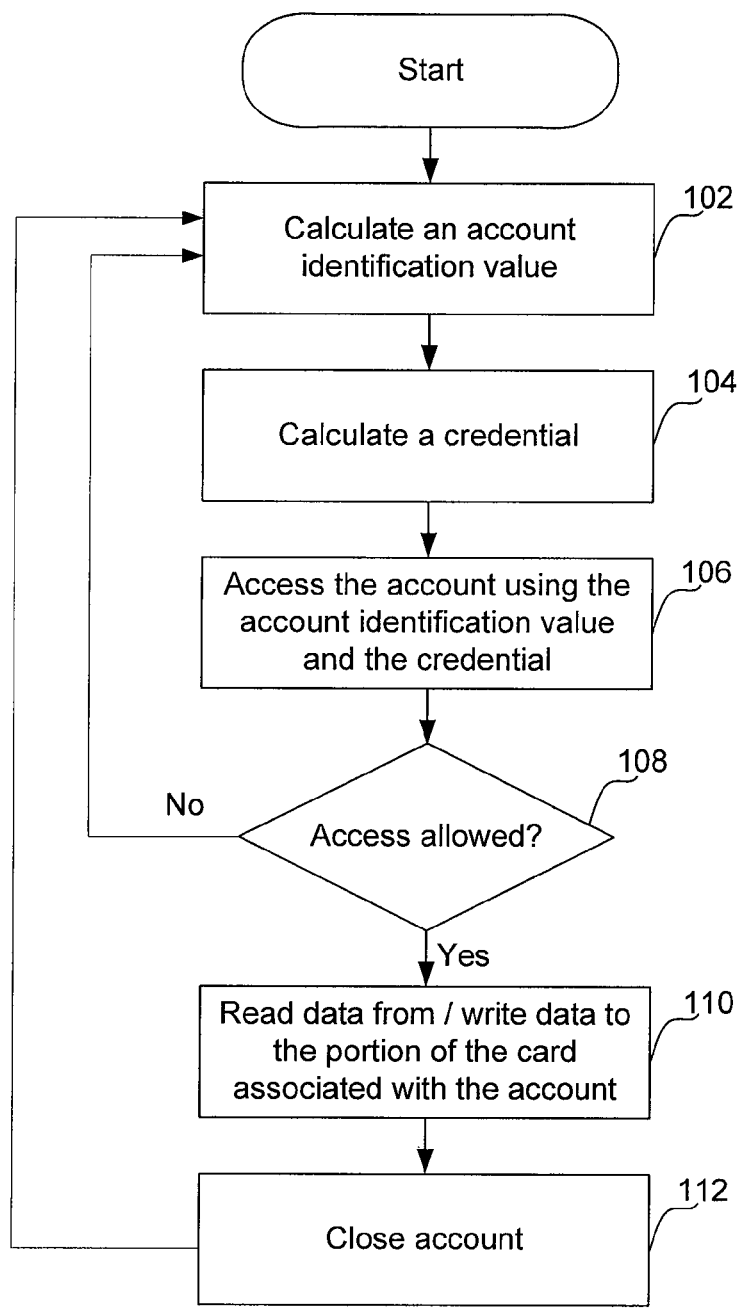
FIG. 1 is a diagram illustrating exemplary steps for accessing an account in a secure system.

In order to access an existing file in the non-volatile memory card, or write a new file to a partition associated with an existing account, a host application may open or "log in" to the account. FIG. 1 is a diagram illustrating exemplary steps for accessing an account in a secure system. In step 102, a host calculates the account identification value corresponding to the account associated with the file or partition to be accessed. Control passes to step 104, where a credential associated with the account is calculated. In step 106, the host attempts to access the account utilizing the credential. Access may only be granted if the calculated credential is the correct value. A variety of algorithms may be utilized to verify the calculated credential. In one example, a credential acts as a password to the account. In this example, the credential is transmitted to the non-volatile memory card, and compared with a stored value at step 108. If the values match, access to the account is granted, and control passes to step 110. If the values do not match, access is denied, and control returns to step 102.

In another example, the credential is an encryption or decryption key, and is used in a challenge/response algorithm. For example, the non-volatile memory card may encrypt a random value with a credential stored when the account was created, and may transmit the encrypted value to the host. The encrypted value is received by the host, and the host decrypts the encrypted random value with the calculated credential and returns the decrypted value to the non-volatile memory card. If the returned decrypted value does not match the original random value, access is denied, and control returns from step 108 to step 102. If the values match, control passes to step 110. At step 110, the host application may read from and write to files associated with the account, or write new files to partitions of non-volatile memory storage associated with the account. The host may close the account at step 112, and control returns to step 102, where the host may initiate another account access.

The exemplary steps 100 for accessing an account in a secure system present several security challenges. If the credential in step 104 is calculated in the host, the formula utilized to calculate the credential may be compromised. Further, the credential may also be compromised if it is merely a constant value looked up in a table in the firmware or software. Moreover, if the calculated credential is not unique for every account, an application with access to one account may re-use a credential to gain unauthorized access to another account.

An account identification value that is unique to a pairing of host and non-volatile memory card may prevent files stored in a non-volatile memory card from being accessed by more than one host. If the calculation of an account identification value in step 102 does not produce a result unique to the host, a plurality of hosts utilizing the same software or firmware to calculate an account identification value may calculate the same account identification value in step 102, and credential in step 104, and thus, be capable of accessing the contents associated with an account in a non-volatile memory card.

A host such as a cellular telephone may be capable of calculating unique account identification and credential values. A cellular telephone in communication with a mobile network, such as Global System for Mobile communication (GSM) or Code Division Multiple Access (CDMA) networks, contains a SIM card or R-UIM card, respectively, that stores one or more values that uniquely identify the subscriber or a subscriber's cellular telephone. Values that may identify a subscriber include an International Mobile Subscriber Identity (IMSI) value; another is a Mobile Subscriber Integrated Services Digital Network (MSISDN) value. Additionally, other MNO-defined values unique to a SIM or R-UIM card, such as a master seed value or a master key value, may be stored in the card, and some of these MNO-defined values may not be read from the card. Values such as the International Mobile Equipment Identity (IMEI) uniquely identify GSM-capable cellular telephones. In addition to providing secure non-volatile storage for parameters defined by a Mobile Network Operator (MNO), a SIM card or R-UIM card typically contains a microcontroller that executes programs that are also defined by an MNO and stored within the SIM or R-UIM card.

Therefore, a unique account identification value or credential may be calculated utilizing IMSI, MSISDN, or similar values stored in a SIM card or R-UIM card, or alternatively, an IMEI value of a cellular telephone. Further, the formula utilized to calculate one or both values may be executed within the SIM card or R-UIM card to prevent the formula from being compromised, or to keep the formula under the control of the MNO. In one embodiment, the formula used to calculate the credential is stored and executed in the SIM card, and the formula utilized to calculate the account identification value is stored and executed in the host.

A typical SIM or R-UIM card contains a limited amount of storage, typically for the storage of subscriber identification values, and telephone contact lists. A product which incorporates high capacity non-volatile storage and the security features of a SIM card or R-UIM card under MNO control is sometimes referred to as a high-capacity SIM card. An example of a high-capacity SIM card is the SIM 5000™, a memory device from SanDisk Corporation of Milpitas, Calif. High-speed SIM cards may support the relatively slower ISO 7816 interface for backwards-compatibility with the existing SIM card receptacle on cellular telephones. Some high-capacity SIM cards may require a high-speed interface, such as a USB, SATA, MMC, or SD interface, in order to access the additional storage space. The SIM card receptacle found on some cellular telephones does not support accessing a high-speed SIM card over an additional, high-speed interface. Many cellular telephones, however, may support high speed access to a high-capacity non-volatile memory card in an additional card receptacle separate from the SIM or R-UIM card receptacle.

Figure 2A:
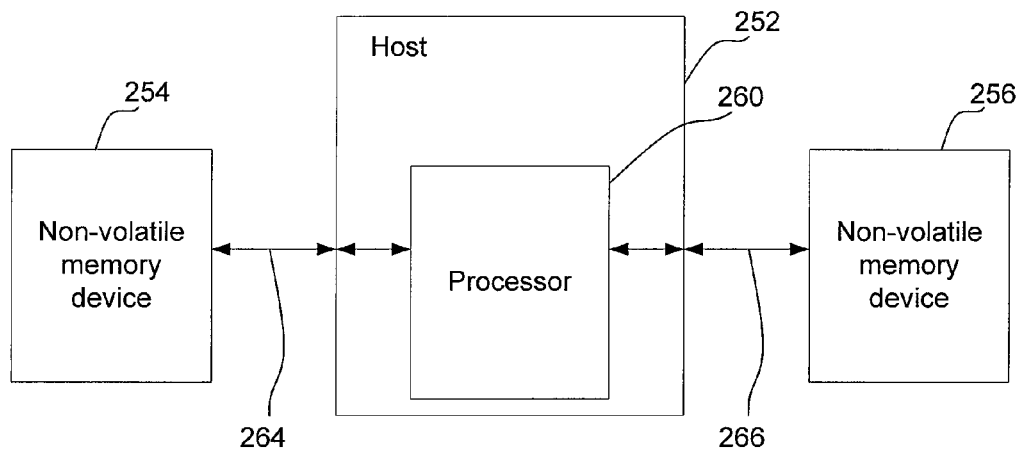
FIG. 2A is a diagram illustrating an exemplary secure storage system in accordance with an embodiment.

Therefore, a system may utilize the security features of a second volatile memory device such as a SIM or R-UIM card, to control access to a first non-volatile memory, such as a high-capacity non-volatile memory card. FIG. 2A is a diagram illustrating an exemplary secure storage system in accordance with an embodiment. An exemplary system 250 comprises a host 252 and two non-volatile memory devices 254 and 256. The host 252 comprises a processor 260. The processor 260 may be configured to communicate with a first non-volatile memory device 256 through a first communications interface 266. The processor 260 may be further configured to communicate with a second non-volatile memory device 254 through a second communications interface 264. The host 252 may be a personal computer, a notebook computer, a personal digital assistant (PDA), a data communication device, a digital camera, a cellular telephone, a portable audio player, an automobile sound system, or other similar types of equipment. In one embodiment, the host 252 and two non-volatile memory devices 254 and 256 are contained within the same enclosure, and one or both non-volatile memory devices 254 and 256 may not be removed from the enclosure.

Figure 2B:
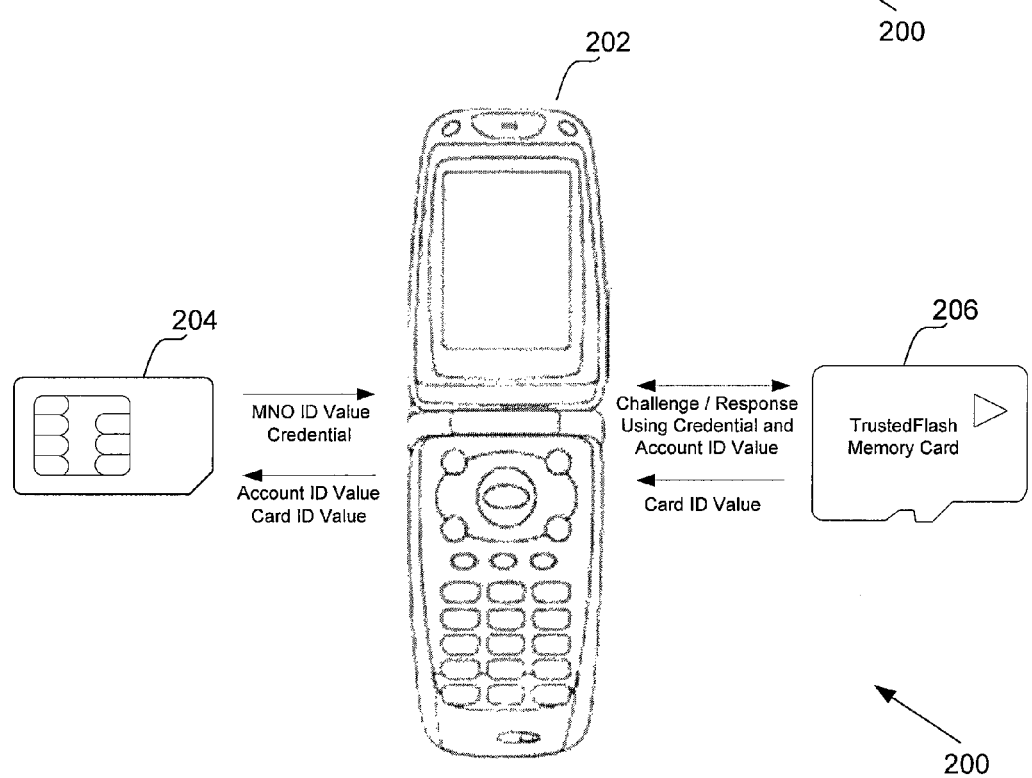
FIG. 2B is a diagram illustrating an exemplary secure storage system in accordance with an embodiment.

In another embodiment, shown in FIG. 2B, the host is a cellular telephone 202, and the non-volatile memory devices are a SIM card 204, and a non-volatile memory card 206. The SIM card 204, and a non-volatile memory card 206 may be inserted into receptacles in the cellular telephone 202, and the cellular telephone may communicate with both cards. In another embodiment, the host 202 and non-volatile memory devices 204, 206 are contained in the same enclosure as the host, and the non-volatile memory devices are not removable.

An exemplary non-volatile memory card 206 may contain a plurality of accounts. Each account may be associated with a plurality of stored files, or storage partitions, in a non-volatile memory card 206. Each account may be identified by a unique account identification value. Each account may also be associated with a credential, which may be utilized with various security methods to limit access to the account. For example, in order to access the files or partitions in a non-volatile memory card 206, a host application may open or "log in" to the account. In one embodiment, the non-volatile memory card 206 with these features is a TrustedFlash™ memory device from SanDisk Corporation of Milpitas, Calif. In other embodiments, other types of non-volatile memory devices may be utilized in accordance with the system and method. For example, other types of memory devices may secure part of all of the storage space utilizing accounts associated with files or partitions, and credentials used in authentication procedures to access an account.

Referring back to FIG. 1, in order to gain access to an account in a non-volatile memory card 206, an account identification value is calculated in step 102, and a credential is calculated in step 104. FIG. 2B also shows an exemplary flow of data between the cellular telephone 202, the SIM card 204, and the non-volatile memory card 206, when performing the steps 100 to gain access to an account in the non-volatile memory card 206. The cellular telephone 202 may read a card identification value, also referred to as a memory identification value, which may uniquely identify a single non-volatile memory card 206 or which may be associated with a group of cards. The cellular telephone 202 may also read an MNO identification value from the SIM card 204. In one embodiment, the MNO identification value is an International Mobile Subscriber Identity (IMSI) value or similar value that uniquely identifies one subscriber or one cellular telephone. In another embodiment, the MNO identification value is the Mobile Country Code (MCC) and the Mobile Network Code (MNC) fields of the IMSI value, or any value which may uniquely identify the MNO. The cellular telephone 202 may use the MNO identification value or the card identification value to calculate an account identification value. The cellular telephone 202 may pass the calculated account identification value, and the card identification value read from the non-volatile memory card 206, to the SIM card 204. The SIM card 204 may utilize these values, and may also use an MNO identification value stored within the SIM card 204, to calculate a credential. The MNO identification value utilized to calculate the credential may preferably be the same MNO value utilized to calculate the account identification value. However, in other embodiments, different MNO identification values may be utilized to calculate the account identification value and the corresponding credential. The cellular telephone 202 receives the calculated credential from the SIM card 204, and may use the account identification value and credential to gain access to an account in the non-volatile memory card 206, using a secure authorization procedure such as a challenge/response algorithm.

The variables utilized by the system 200 to calculate the account identification value and credential may differ depending on the type of secure account being accessed. The secure accounts may be broadly categorized into downloaded content accounts, and preloaded content accounts.

A downloaded content account may be associated with the digital content downloaded by the host 202 and stored on the non-volatile memory card 206. In one embodiment, the host 202 is a cellular telephone, and the content may be downloaded through a connection established with an MNO, or an internet connection established through a wired or wireless connection. It may be desirable to limit access to the downloaded content to an individual subscriber of a mobile network, or to any subscriber of a particular mobile network. In one embodiment, an MNO may limit access by programming a cellular telephone 202 to calculate an account identification value utilizing a unique value associated with one subscriber, such as an International Mobile Subscriber Identity (IMSI) value or similar value that uniquely identifies one subscriber. Such a value may be stored in the SIM card 204. In this embodiment, because the account identification value is calculated a utilizing the a unique value associated with one subscriber, the content stored in the non-volatile memory card 206 and associated with that account identification value may only be accessed by a host 202 in communication with that particular subscriber's SIM card 204.

In another embodiment, an MNO may limit access to downloaded content by creating a downloaded content account with an account identification value based on a unique value associated with the MNO, such as a value formed from the Mobile Country Code (MCC) and the Mobile Network Code (MNC) fields of the IMSI value. The MCC and MNC mobile network identification values may also be stored in the SIM card 204, and may uniquely identify a subscriber's MNO. In this embodiment, because the account identification value is calculated utilizing a unique value associated with the network of one MNO, the content stored in the non-volatile memory card 206 and associated with that account identification value may be accessed by a host 202 in communication with any SIM card 204 associated with that particular MNO. In this way, subscriber of a mobile network may replace a SIM card 204 and old host 202 with a new host 202 and SIM card 204 from the same MNO, and still be able to access content downloaded and stored on the non-volatile memory card 206 by the old host. In another example, the content stored in the non-volatile memory card 206 and associated with an account identification value derived from a mobile network identification value may be accessible from the cellular telephone hosts of two or more subscribers of the same MNO.

As shown above, two removable components of the system 200 of FIG. 2B are used to implement the account access steps 100 of FIG. 1. A new system 200 may be formed for each combination or pairing of a SIM card 204 and a non-volatile memory card 206. While the SIM card 204 and the non-volatile memory card 206 may be physically separable from the system 200, the downloaded content in non-volatile memory card 206 may only be accessible in a system 200 that utilizes a particular SIM card 204. In this way, the SIM card 204 and the non-volatile memory card 206 can be said to be bound to one another. Binding may also refer to the process of creating accounts in the non-volatile memory card 206 using account identification values and credentials calculated with unique or special values in stored in the SIM card 204. These accounts may be associated with content downloaded and stored in the non-volatile memory card 206. The type of binding depends on the values utilized to calculate the account identification value and credential value. If the values utilized are unique to a SIM, such as an IMSI or a MSISDN value, the binding may be referred to as SIM binding. If the values utilized are unique to a cell phone, such as an IMEI value, the binding may be referred to as cellular telephone binding or handset binding. If the values utilized are unique to an MNO, such as a value formed from the Mobile Country Code (MCC) and the Mobile Network Code (MNC) fields of the IMSI value, the binding may be referred to as MNO binding.

In another embodiment, an MNO or content provider may not desire to restrict access to downloaded content to a particular subscriber or cellular telephone, or to subscribers of a particular network. In this embodiment, the downloaded content is not bound to a particular SIM card, to a particular cellular telephone, or to a particular MNO. The account identification values utilized may be predetermined or static values, such as the ASCII value corresponding to the string "download," or values associated with a particular content provider, such as "download_MNO." The account identification value may also be computed utilizing one or more card identification values stored within the non-volatile memory card 206, which may uniquely identify a single non-volatile memory card 206, or which may be associated with a group of cards.

In this embodiment, a value associated with a subscriber's IMSI value or a cellular telephone IMEI value may not be utilized to calculate the account identification and credential values for the downloaded content account. If the subscriber's IMSI value or cellular telephone IMEI value is not utilized, a downloaded content account may be accessible in a number of hosts 202 utilizing SIM cards 204 with different IMSI values. Instead, the account identification value of a downloaded content account may be a fixed value or may be based on a value stored within the non-volatile memory card 206 containing the account. The credential may be calculated utilizing the calculated account identification value or the value stored within the non-volatile memory card 206. A non-volatile memory card 206 containing downloaded content accounts created utilizing these input variables may be accessed by a variety of systems 200 utilizing the correct formula or program to calculate the credential and account identification value, and is not dependent on a unique subscriber identification value stored in the SIM card 204, or a unique hardware identification value associated with a host 202.

A preloaded content account may be associated with digital content stored on the non-volatile memory card 206 before a user attempts to operate the card within a system, such as the system 200. In one example, a non-volatile memory card 206 is sold or provided to the user with content, such as mp3 audio files, picture files, or video files, already stored or preloaded onto the card. A plurality of preloaded accounts may be utilized, corresponding to different content providers. The account identification values may be predetermined or static values, such as the ASCII value corresponding to the string "preload," or values associated with a particular content provider, such as "preload_MNO." The account identification value may also be computed utilizing one or more card identification values stored within the non-volatile memory card 206, which may uniquely identify a single non-volatile memory card 206, or which may be associated with a group of cards, such as a group of cards sold with the same preload content account or accounts.

In this embodiment, a value associated with a subscriber's IMSI value or a cellular telephone IMEI value may not be utilized to calculate the account identification and credential values for the preloaded content account, because the preloaded content accounts on the non-volatile memory card 206 are created before the card is operated within the system 200 containing the subscriber's SIM card 204. If the subscriber's IMSI value or cellular telephone IMEI value is not utilized, a preloaded content account may be accessible in a number of hosts 202 utilizing SIM cards 204 with different IMSI values. Instead, the account identification value of a preloaded content account may be a fixed value or may be based on a value stored within the non-volatile memory card 206 containing the account. The credential may be calculated utilizing the calculated account identification value or the value stored within the non-volatile memory card 206. By utilizing these input variables, a non-volatile memory card 206 containing preloaded content accounts may be accessed by a variety of systems 200 utilizing the correct formula or program to calculate the credential and account identification value, and is not dependent on a unique subscriber identification value stored in the SIM card 204, or a unique hardware identification value associated with a host 202.

Therefore, depending on whether preloaded content is being accessed, or downloaded content is being stored or accessed, the variables utilized to calculate the account identification value and credential may differ. When preloaded content is accessed, SIM binding, handset binding, or MNO binding may not be performed, and therefore, the MNO identification values are not utilized to calculate account identification values or credential values. When downloaded content is being stored or accessed, SIM binding, handset binding, or MNO binding may preferably be performed, and MNO identification values such as IMEI, IMSI, or MSISDN values may be utilized to calculate account identification values or credential values. However, in other embodiments, SIM binding, handset binding, and MNO binding are not used when creating accounts and credentials for downloaded content. Thus, the account identification value calculation in step 102 of FIG. 1 and the credential calculation in step 104 of FIG. 1 require further elaboration, when applied in the system 200 of FIG. 2B.

Figure 3:
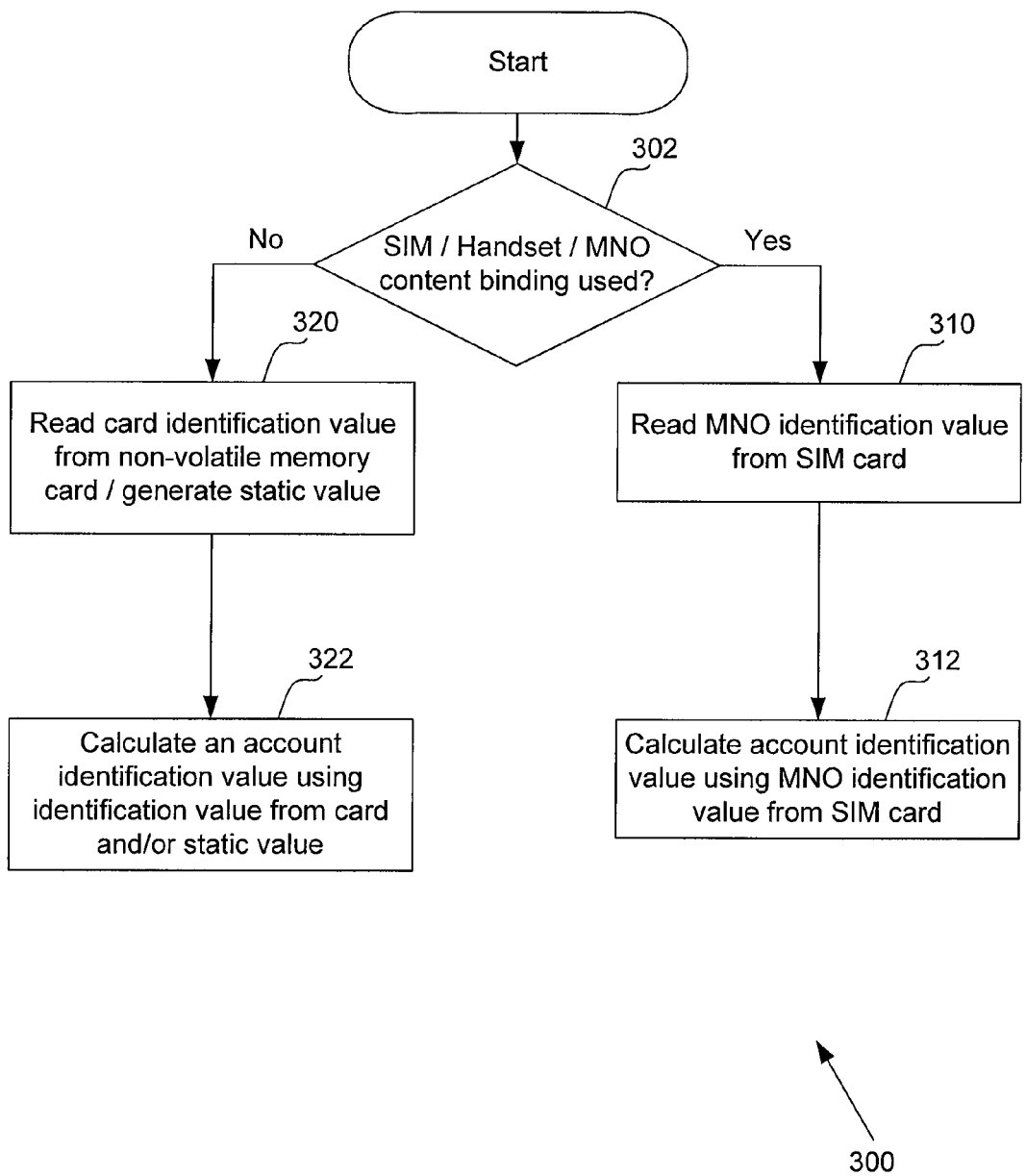
FIG. 3 is a diagram illustrating exemplary steps for calculating an account identification value in a secure system in accordance with an embodiment.

Referring briefly back to FIG. 1, in order to read a file from or write a new file to the secure storage within the non-volatile memory card 206, an account identification value may be calculated in step 102 in order to access an existing account, or create a new account. The system 200 comprising a SIM card 204, a non-volatile memory card 206, and host 202 may be utilized to calculate an account identification value in step 102. FIG. 3 is a diagram illustrating exemplary steps for calculating an account identification value in a secure system in accordance with an embodiment. At step 302, the host determines whether the account to be opened is bound to a SIM card, an MNO, or a particular cellular telephone. Such binding may be utilized for downloaded content. If SIM binding, MNO binding, or cell phone binding is utilized, control passes to step 310, where the host reads an MNO identification value from the SIM card. Depending on the degree of binding between the SIM card and the non-volatile memory card, the identification value may be a value unique to a single subscriber, such as an IMSI value or MSISDN value, a value unique to a cellular telephone, such as an IMEI value, or a value unique to a particular MNO, such as value formed by the combination of the Mobile Country Code (MCC) and the Mobile Network Code (MNC) fields of the IMSI value. Control passes to step 312, where the host calculates the account identification value utilizing the MNO value read from the SIM card.

For preloaded content, and some types of downloaded content, an account may be created without SIM binding, MNO binding, or cell phone binding. If the host is opening this type of account, then control passes from step 302 to step 320, where an identification value is read from the non-volatile memory card. The card identification value may uniquely identify a single non-volatile memory card, or the value may be associated with a group of cards, such as a group of cards sold or distributed with the same preloaded content. A predetermined or static value may also be determined by the host, such the ASCII value of the string "preload," "download," "preload_MNO," or "download_MNO," where "MNO" identifies a content provider. Control passes to step 322, where an account identification value is formed, using either the predetermined or static value, a value calculated from the card identification value, or a combination or concatenation of the two. For example, if the static value is "preload," and the value calculated from the card identification value is 1234, then the combination or concatenation may be the ASCII value of the string "preload_1234."

In one embodiment, the host, such as a cellular telephone, may calculate the account identification value utilizing the steps 300. In another embodiment, the host may pass the input parameters, such as the static value, and the card identification value, to the SIM card, and trigger the SIM card to perform the account identification value calculation. In this embodiment, the SIM card may utilize the MNO identification value within the SIM card, without passing it to and from the host. In this embodiment, the MNO identification value utilized may be a value not readable from the SIM card by the host, such as a MNO-defined master seed value or a MNO-defined master key value. The SIM card may return the calculated account identification value to the host once the calculation is complete.

Figure 4:
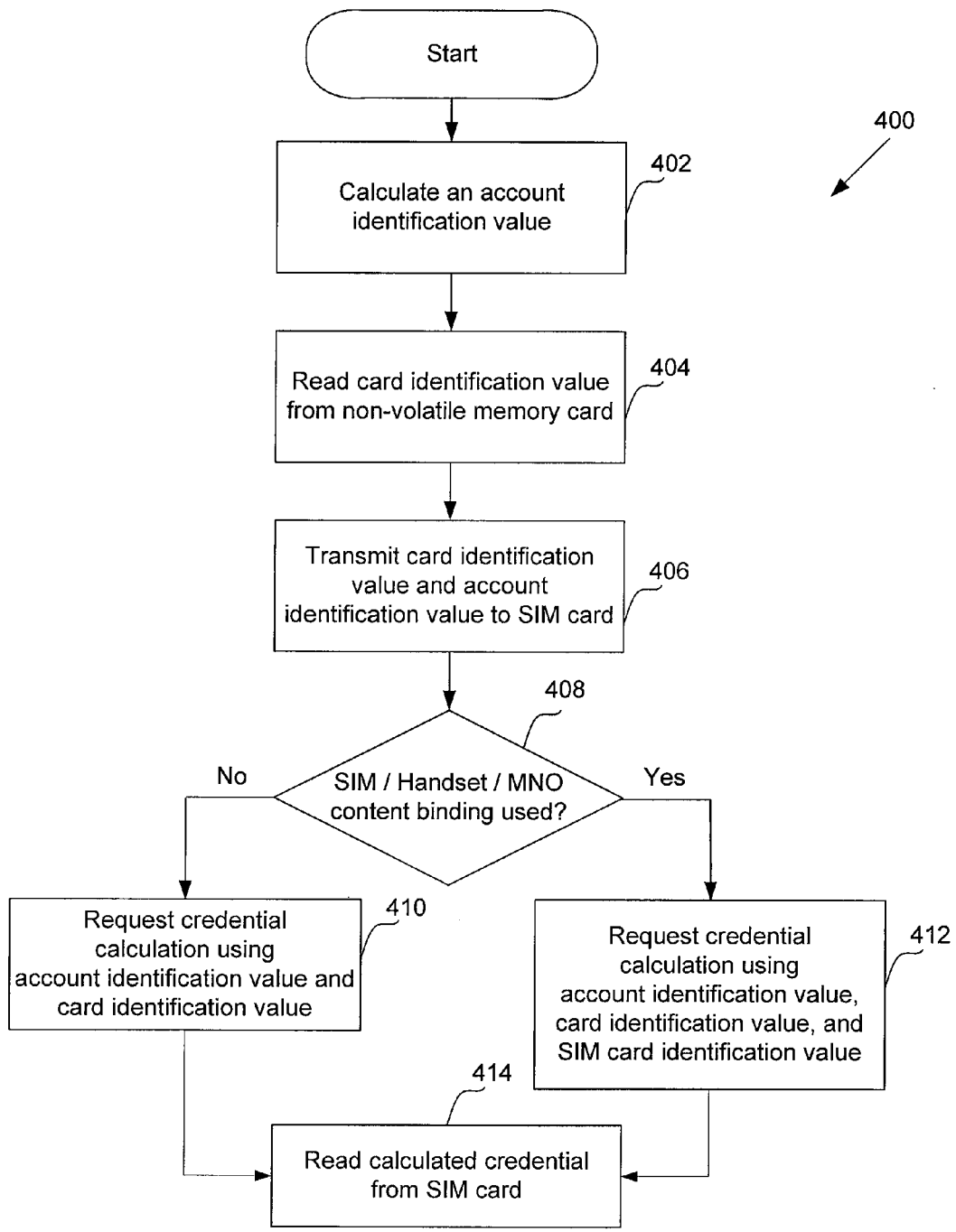
FIG. 4 is a diagram illustrating exemplary steps for calculating a credential value in a secure system in accordance with an embodiment.

Referring briefly back to FIG. 1, in order to read a file from or write a new file to the secure storage within the non-volatile memory card 206, a credential may be calculated in step 104 in order to access an existing account, or create a new account. The system 200 comprising a SIM card 204, a non-volatile memory card 206, and a host 202 may be utilized to calculate a credential in step 104. FIG. 4 is a diagram illustrating exemplary steps for calculating a credential value in a secure system in accordance with an embodiment. In step 402, an account identification value is calculated. The account identification value may be calculated utilizing the steps 300 shown in FIG. 3. Control passes to step 404, where an identification value is read from the non-volatile memory card. The card identification value may uniquely identify a single non-volatile memory card, or the value may be associated with a group of cards. In step 406, the card identification value and the account identification value are transmitted to the SIM card. At step 408, the type of credential calculation requested is dependent on whether the secure account to be accessed is bound to a SIM card, an MNO, or a particular cell phone. Such binding may be utilized for downloaded content.

If SIM binding, MNO binding, or cell phone binding is utilized, then control passes to step 412, where the host requests that the SIM card calculates a credential utilizing the account identification value, card identification value, and an identification value stored within the SIM card, such as an IMSI, MSISDN, IMEI, or the combined MCC/MNC value. The selection of the SIM card identification value may depend on or correspond to the value selected in order to calculate the account identification value in step 312 of FIG.

3. For example, for subscriber or SIM binding, if the account identification value is calculated using the IMSI value, the corresponding credential for that account may be calculated utilizing the same IMSI value. In another example, for MNO binding, if the account identification value is calculated using or the combined MCC/MNC value, the corresponding credential for that account may be calculated utilizing the same combined MCC/MNC value. Control then passes to step 414, the host receives the calculated credential from the SIM card.

For preloaded content, and some types of downloaded content, an account and corresponding credential may be created without SIM binding, MNO binding, or cell phone binding. If the host is determining a credential to open this type of account, then control passes from step 408 to step 410, where the host requests that the SIM card calculates a credential utilizing the account identification value and the card identification value. At step 414, the host receives the calculated credential from the SIM card.

Referring briefly back to FIG. 1, the exemplary steps 100 assumed that an account is already established in the non-volatile memory card to be accessed. This may not always be the case. When a new file is being written to a non-volatile memory card, it may be necessary to create an account to associate with the file to be written. Similarly, when a new non-volatile memory card is being initialized, such as when a host first interacts with a particular non-volatile memory card, the host may determine which accounts already exist, and which accounts should be created. For example, a downloaded content account may have an account identification value calculated using a unique value associated with a subscriber's SIM card, such as the IMSI number stored within the SIM card 204 of FIG. 2B. Therefore, when a non-volatile memory card 206 is first introduced to the system 200, the host 202 may create a downloaded content account that is bound with the system 200, or more specifically, with identification values in the SIM card 204, in order to download and store files to the non-volatile memory card 206.

Figure 5:
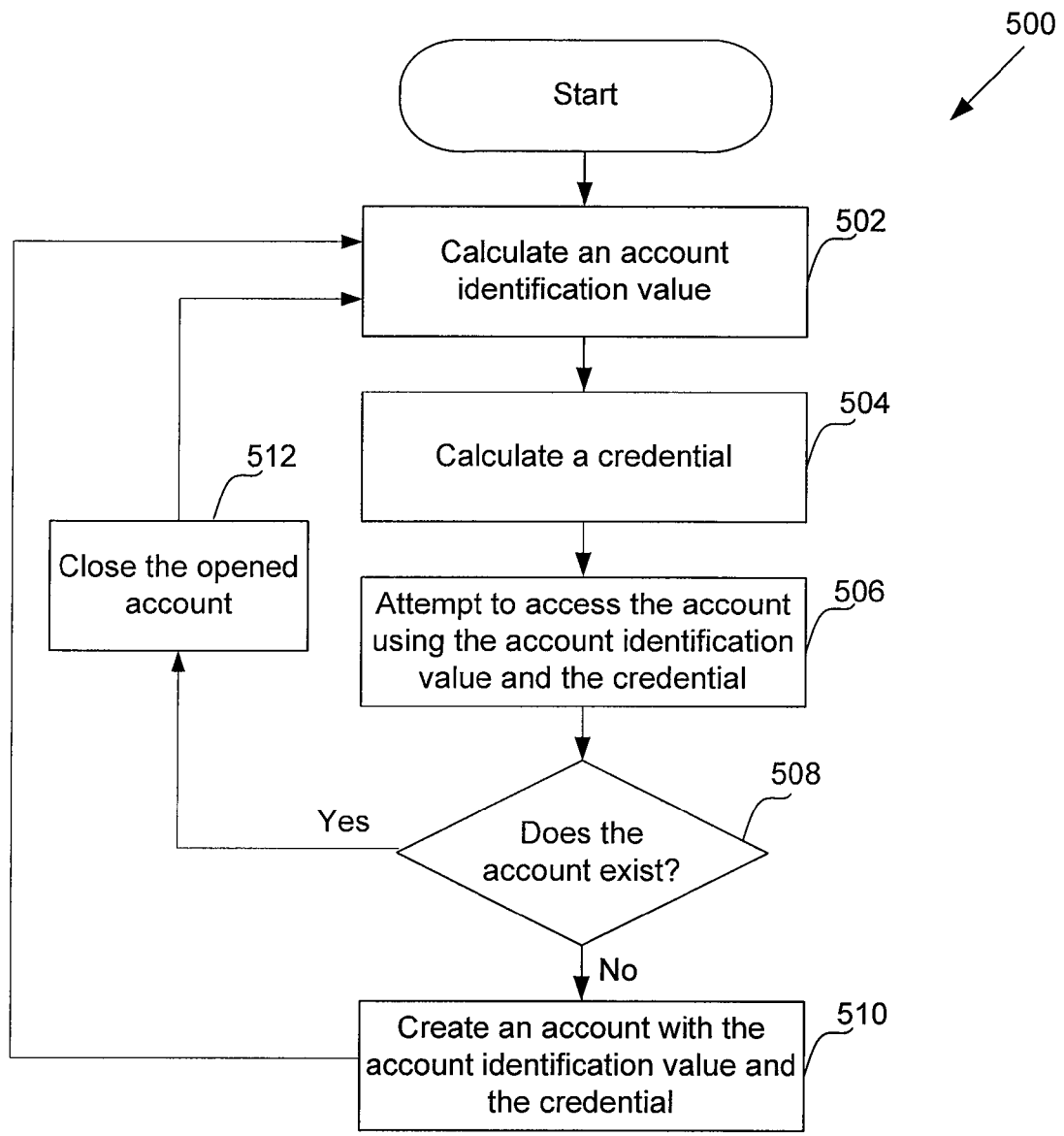
FIG. 5 is a diagram illustrating exemplary steps for creating a new storage account in a secure system in accordance with an embodiment.

A host, such as host 202 in FIG. 2B, may determine whether an account should be created by generating an account identification value and attempting to access an account with that account identification value in the non-volatile memory card 206. If the access fails, then the host 202 may create a new account utilizing the calculated account identification value. FIG. 5 is a diagram illustrating exemplary steps for creating a new storage account in a secure system in accordance with an embodiment. In step 502, a host calculates the account identification value corresponding to an account to be created, or corresponding to an account associated with a file to be stored. Referring briefly back to FIG. 3, the account identification value may be calculated utilizing the exemplary steps 300. Control passes to step 504, where a credential associated with the account is calculated. Referring briefly back to FIG. 4, the credential may be calculated utilizing the exemplary steps 400.

In step 506, the host attempts to access the account utilizing the calculated credential and the calculated account identification value. In response, the non-volatile memory card may return a successful result and open the account. Therefore, the account exists, and control returns from step 508 to step 512, where the opened account is closed, and then returns back to step 502. Alternatively, the non-volatile memory card may indicate that the account does not exist, or may instead indicate that the account access failed, in which case, the host may assume that the account does not exist. In this case control passes from step 508 to step 510. In step 510, the host may create a new account on the non-volatile memory card utilizing the calculated account identification value and the calculated credential. The account creation process may include a series of commands and responses, such as transmitting the account identification value and credential from the host to the non-volatile memory card, and may further include a separate authorization procedure.

Multiple downloaded content accounts may be created on a single non-volatile memory card, where each downloaded content account has an account identification value based on a different SIM card ISMI. For example, a first host 202 and first SIM card 204 may be used to download and store content into a non-volatile memory card 206. The account identification value associated with the first created downloaded content account may be based on a value unique a subscriber, such as an ISMI value in the first SIM card 204. The same non-volatile memory card may be used to store content downloaded using a second host 202 and second SIM card 204. The account identification value associated with the second created downloaded content account may be based on the different ISMI value stored in the second SIM card 204. In this way, multiple downloaded accounts may be co-exist on a single non-volatile memory card 206.

Referring briefly back to FIG. 1, until this point, it has been assumed that the formula used to calculate the credential in the exemplary steps 100 is already stored in the SIM card 204 of FIG. 2B. This may not always be the case. For example, a SIM card 204 in the system 200 may be replaced with a SIM card without a formula. In another example, an MNO may provide a cellular telephone 202 with a SIM card 204 that does not contain the formula. When a non-volatile memory card 206 is inserted into the host 202, the host 202 may determine whether the SIM card 204 contains the formula required to compute a credential for account creation or access. If the host 202 determines that the SIM card 204 does not contain the formula, the host 202 may obtain the formula and store it in the SIM card 204.

In one embodiment, the host 202 contacts a server, receives the formula from the server, and stores the formula in the SIM 204. The server may verify that host 202 has permission to receive the formula. Additionally, the host may verify the downloaded formula, and verify that the downloaded formula has been transmitted from a trusted source. In one embodiment, the host 202 is a cellular telephone, and the server request and formula download are over the air (OTA) transmissions of secure short messages (SSM). The downloaded formula may be encrypted. The host 202 may decrypt the received formula before storing in the SIM card 204. Alternatively, the microcontroller in the SIM card 204 may decrypt the formula before storage or use within the SIM card 204.

In another embodiment, the formula may be stored in the non-volatile memory card 206. The host 202 may read the formula from the non-volatile memory card 206, and store it in the SIM card 204. Depending on the embodiment, there are several methods of securing the formula stored in the non-volatile memory card 206, and each method may be used individually or in combination with other methods. In one embodiment, the formula stored in the non-volatile memory card 206 is encrypted. The host 202 may decrypt the formula read from the non-volatile memory card 206 before storing it in the SIM card 204. Alternatively, the microcontroller in the SIM card 204 may decrypt the formula before storage or use within the SIM card 204. In another embodiment, the formula is stored in a protected partition in the non-volatile memory card 206. The host 202 may calculate an account identification value and credential in order to access the partition and formula, utilizing the exemplary steps 100 of FIG. 1. In this embodiment, the account identification value may be a static value, and the calculated credential may be calculated without using the formula stored in the non-volatile memory card 206. A protected partition may also be referred to as a hidden partition, because a protected partition may not be visible to or accessible by a host file system, and a host application may trigger a security authorization routine such as the exemplary steps 100 in order to access the partition.

If the SIM card 204 is also utilized to calculate the account identification value, similar methods may be used to retrieve an additional program from a server or from the non-volatile memory card 206.

Figure 6:
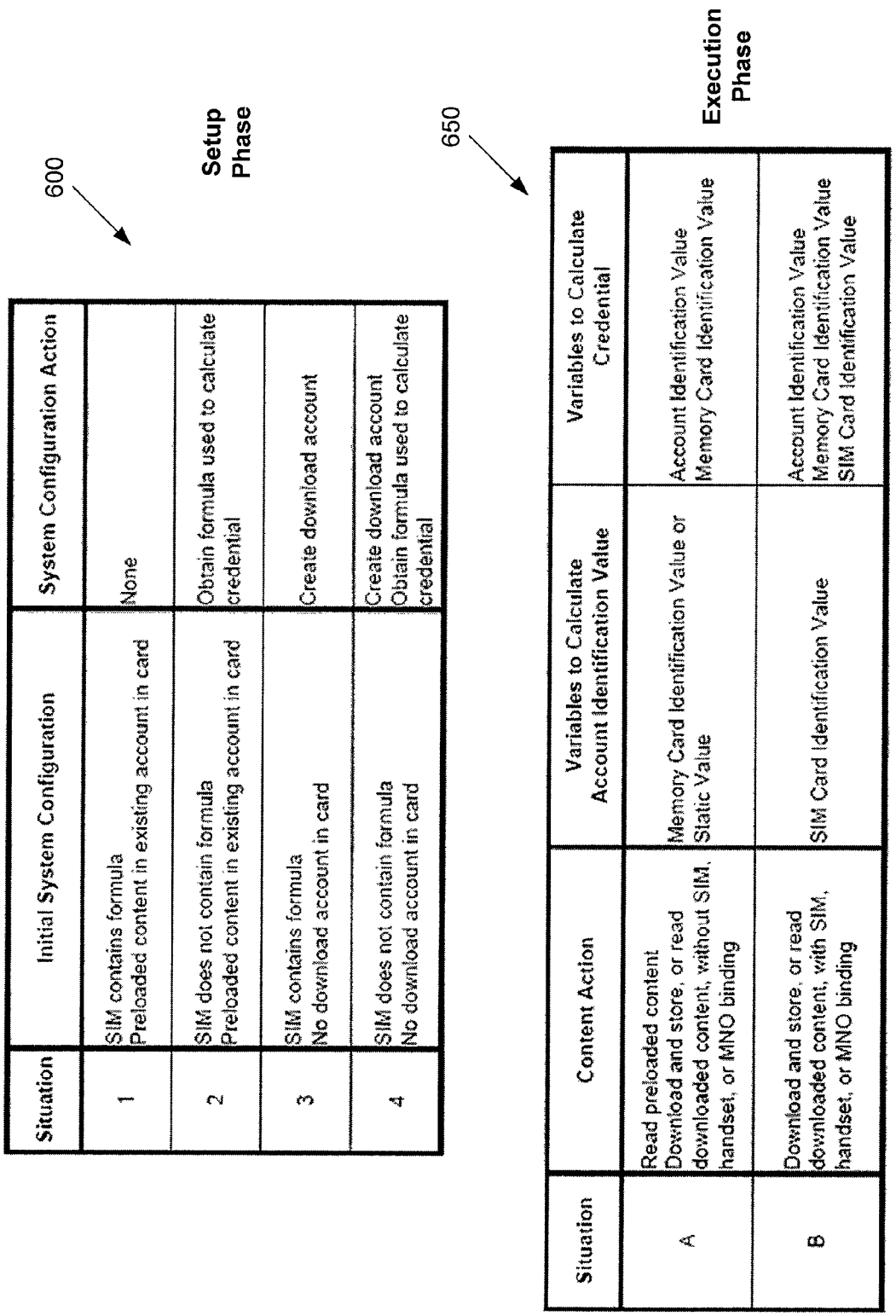
FIG. 6 is a diagram illustrating exemplary situations for configuration and use of a secure storage system, in accordance with an embodiment.

Referring back to FIG. 2B, where a system utilizes one non-volatile memory 204 to at least partially control access to storage within a second non-volatile memory 206, there are a variety of configuration and usage scenarios introduced by the fact that the two non-volatile memories 204, 206 may be individually separable from each other and the system 200. For example, a non-volatile memory card 206 may be preloaded with content and associated accounts, or may have not have any accounts established in the card. In another example, a SIM card 204 may not have the formula or program required to calculate the account identification value, or the credential. FIG. 6 is a diagram illustrating exemplary situations for configuration and use of a secure storage system, in accordance with an embodiment. The exemplary situations may be divided into a setup phase 600, where the system is configured, and an execution phase 650, where the system is used to read and write content.

The chart corresponding to the setup phase 600 shows various initial configurations a system, such as system 200 of FIG. 2B. In a first initial configuration, the SIM card 204 contains the formula or program needed to calculate the credential and possibly the account identification value, and the preloaded content accounts are already created in the non-volatile memory card 206. This situation may occur when an MNO provides a system 200 to a subscriber containing a pre-configured SIM card 204 and a non-volatile memory card 206 with preloaded content. In this situation, no additional configuration is required, and the system is configured to access the preloaded content.

In a second initial configuration, the SIM card 204 does not contain the formula or program needed to calculate the credential and possibly the account identification value, and the preloaded content accounts are already created in the non-volatile memory card 206. This situation may occur when an MNO provides the cellular telephone 202 and the SIM card 204, and the subscriber purchases or obtains a non-volatile memory card 206 with preloaded content, and installs the non-volatile memory card 206 into the cellular telephone 202. In this situation, the formula or program may be downloaded from a server, or retrieved from the non-volatile memory card 206, and installed in the SIM card 204. The system is then configured to access the preloaded content.

In the first or second situation, if a subscriber later decides to download and store content to the non-volatile memory card 206, a downloaded content account may be created utilizing the steps 300 in FIG. 3, and the account may be accessed to store downloaded content using the steps 100 of FIG. 1. Thus, preloaded content accounts and downloaded content accounts may co-exist on the same non-volatile memory card 206.

In a third initial configuration, the SIM card 204 contains the formula or program needed to calculate the credential and possibly the account identification value, and the non-volatile memory card 206 does not contain an account to associate downloaded content with. This situation may occur when an MNO provides the cellular telephone 202 and the SIM card 204, and the subscriber purchases or obtains a non-volatile memory card 206, and installs the non-volatile memory card 206 into the cellular telephone 202. In this situation, a downloaded content account may be created utilizing the steps 300 in FIG. 3, and the account may be accessed to store downloaded content using the steps 100 of FIG. 1.

In a fourth initial configuration, the SIM card 204 does not contain the formula or program needed to calculate the credential and possibly the account identification value, and the non-volatile memory card 206 does not contain an account to associate downloaded content with. This situation may occur when an MNO provides the cellular telephone 202 and the SIM card 204, and the subscriber purchases or obtains a non-volatile memory card 206, and installs the non-volatile memory card 206 into the cellular telephone 202. In this situation, the formula or program may be downloaded from a server, or retrieved from the non-volatile memory card 206, and installed in the SIM card 204. Once the formula or program is installed, a downloaded content account may be created utilizing the steps 300 in FIG. 3, and the account may be accessed to store downloaded content using the steps 100 of FIG. 1.

Once a system 200 of FIG. 2B is configured to access content, the setup phase 600 is complete, and the execution phase begins, where the exemplary steps 100 of FIG. 1 may be executed to access or store content in the non-volatile memory card 206 of the system 200. The calculation of the account identification value in step 102 of FIG. 1 may be performed according to steps 300 of FIG. 3. Further, the calculation of the credential in step 104 of FIG. 1 may be performed according to the steps 400 of FIG. 4. The steps 300 FIG. 3 and the steps 400 of FIG. 4 show that different input variables may be utilized to calculate the account identification value and the credential, respectively, depending on whether preloaded content or downloaded content is being accessed in the non-volatile memory 206. The chart corresponding to the execution phase 650 of FIG. 6 summarizes the differences.

In Situation A of the chart for the execution phase 650, the cellular telephone 202 attempts to access preloaded content, or store and access downloaded content associated with an account created without SIM binding, cellular telephone binding, or MNO binging, on the non-volatile memory card 206. In this situation, a card identification value from the non-volatile memory card 206, or a static value, may be utilized to compute an account identification value. The calculated account identification value and a card identification value from the non-volatile memory card 206 may be utilized to calculate the credential. The calculated credential and the calculated account identification value may be used to access the preloaded content account in the non-volatile memory card according to the remaining steps 106-112 of FIG. 1.

In Situation B of the chart for the execution phase 650, the cellular telephone 202 attempts to download and store content to the non-volatile memory card 206, or access downloaded content already stored in the non-volatile memory card 206, where the downloaded content is associated with an account created with SIM binding, cellular telephone binding, or MNO binding. In this situation, an MNO identification value from the SIM card 204 may be utilized to compute an account identification value. Depending on the degree of binding between the SIM card 204 and the non-volatile memory card 206, the identification value may be a value unique to a single subscriber, such as an IMSI value or MSISDN value, a value unique to a cellular telephone, such as an IMEI value, or a value unique to a particular MNO, such as value formed by the combination of the Mobile Country Code (MCC) and the Mobile Network Code (MNC) fields of the IMSI value. The calculated account identification value, a card identification value from the non-volatile memory card 206, and the MNO identification value may be utilized to calculate the credential. The calculated credential and the calculated account identification value may be used to access the downloaded content account according to the remaining steps 106-112 of FIG. 1.

Thus, non-volatile memory 206 in exemplary system 200 may be accessed according to the security protocol steps 100 of FIG. 1. The calculation of the account identification value in step 102, and the calculation of the associated security credential in step 104, may be further secured by utilizing a second non-volatile memory device, such as a SIM card 204, to provide input variables and perform some of all of the calculation of the values. Specifically, in some cases, a SIM card 204 may provide unique identification values in order to calculate the account identification value according to steps 300 of FIG. 3. Additionally, the SIM card 204 may provide unique identification values, and may also be used to calculate the credential value according to steps 400 of FIG. 4. Utilizing the exemplary steps 100, 300, and 400 of FIGS. 1, 3, and 4, an MNO may bind selected downloaded content with an individual subscriber, an individual cellular telephone, or an individual MNO. Alternatively, downloaded content may be stored in accounts created without binding to an individual subscriber, an individual cellular telephone, or individual MNO. Depending on the type of binding utilized, an MNO may restrict access to and copying of downloaded content by unauthorized users. Additionally, an MNO may support a system 200 that may access preloaded content securely stored on mass produced non-volatile memory cards 206, and may control access to that preloaded content provided on a non-volatile memory card 206.

While the system 200 in FIG. 2B utilizes a SIM card 204, various other embodiments may not be limited to this configuration. For example, a high-capacity SIM card, such as the SIM 5000™, a memory device from SanDisk Corporation of Milpitas, Calif., may be utilized in place of the SIM card 204. In this system 200, the high-capacity SIM card may perform the functions associated with the SIM card 204, such as calculating the credentials or account identification value utilized for account access, or storing unique subscriber, equipment, and MNO identification values. The additional storage within the high-capacity SIM card may augment or supplement the total amount of secure storage available to the user of the system 200.

Further, while other aspects of the systems and methods may have been described with respect to the use of Subscriber Identity Module (SIM) cards and identification values associated with SIM cards and GSM networks, these embodiments may not be so limited. Embodiments in accordance with various principles of the present invention may also be implemented in systems that utilize other card formats, such as high-capacity SIM cards, Smart Cards, or R-UIM cards. Moreover, although various principles of the invention have been described with respect to various exemplary embodiments, it will be understood that the invention is entitled to protection within the full scope of the appended claims.

The invention claimed is:

1. A method of creating a secure storage account to permit access to protected content in a non-volatile memory device, comprising:
reading a memory identification value from a first non-volatile memory device;
calculating an account identification value;
transmitting said memory identification value and said account identification value to a second non-volatile memory device;
receiving a credential from said second non-volatile memory device, wherein said credential is calculated utilizing said memory identification value, said account identification value, and a formula;
transmitting a command to create a secure storage account in said first non-volatile memory device, wherein said command comprises said credential and said account identification value;
wherein said calculation of said credential further utilizes a second memory identification value stored within said second non-volatile memory device, and wherein said calculating said account identification value further comprises:
reading a third memory identification value from said second non-volatile memory device; and
calculating the account identification value utilizing said third memory identification value.

2. The method of claim 1, wherein said second memory identification value stored within said second non-volatile memory device is an International Mobile Subscriber Identity value.

3. The method of claim 1, wherein said second memory identification stored within said second non-volatile memory device is a Mobile Subscriber Integrated Services Digital Network value.

4. The method of claim 1, wherein said first non-volatile memory device is a TrustedFlash device.

5. The method of claim 1, wherein said second non-volatile memory device is a Subscriber Identity Module card.

6. The method of claim 1, wherein said second non-volatile memory device is a Re-Usable Identification Module card.

7. The method of claim 1, wherein said calculating said account identification utilizes a predetermined value.

8. The method of claim 1, wherein said calculating said account identification utilizes said memory identification value.

9. The method of claim 1, wherein said credential is an encryption key.

10. The method of claim 1, wherein said credential is a decryption key.

11. The method of claim 1, further comprising:
reading said formula from said first non-volatile memory device; and
storing said formula in said second non-volatile memory device.

12. The method of claim 11, wherein said formula is encrypted.

13. The method of claim 11, wherein said formula is stored in a protected partition of said first non-volatile memory device.

14. The method of claim 1, further comprising:
requesting said formula from a server;
receiving said formula from said server; and
storing said formula in said second non-volatile memory device.

15. A method of accessing a secure storage account in a non-volatile memory device, comprising:
reading a memory identification value from a first non-volatile memory device;
calculating an account identification value;
transmitting said memory identification value and said account identification value to a second non-volatile memory device;

receiving a credential from said second non-volatile memory device, wherein said credential is calculated utilizing said memory identification value, said account identification value, and a formula;

performing an account access sequence, wherein said account access sequence comprises transmitting a command, wherein said command comprises said account identification value and a value based on said credential;

wherein said calculation of said credential further utilizes a second memory identification value stored within said second non-volatile memory device, and wherein said calculating said account identification value further comprises:

reading a third memory identification value from said second non-volatile memory device; and calculating the account identification value utilizing said third memory identification value.

16. The method of claim 15, wherein said second memory identification value stored within said second non-volatile memory device is an International Mobile Subscriber Identity value.

17. The method of claim 15, wherein said second memory identification value stored within said second non-volatile memory device is a Mobile Subscriber Integrated Services Digital Network value.

18. The method of claim 15, wherein said first non-volatile memory device is a TrustedFlash device.

19. The method of claim 15, wherein said second non-volatile memory device is a Subscriber Identity Module card.

20. The method of claim 15, wherein said second non-volatile memory device is a Re-Usable Identification Module card.

21. The method of claim 15, wherein said calculating said account identification utilizes a predetermined value.

22. The method of claim 15, wherein said calculating said account identification utilizes said memory identification value.

23. The method of claim 15, wherein said credential is an encryption key.

24. The method of claim 15, wherein said credential is a decryption key.

25. The method of claim 15, further comprising:
reading said formula from said first non-volatile memory device; and
storing said formula in said second non-volatile memory device.

26. The method of claim 25, wherein said formula is encrypted.

27. The method of claim 25, wherein said formula is stored in a protected partition of said first non-volatile memory device.

28. The method of claim 15, further comprising:
requesting said formula from a server;
receiving said formula from said server; and
storing said formula in said second non-volatile memory device.

29. The method of claim 15, further comprising:
receiving a result from said first non-volatile memory device, wherein said result is indicative of an existence of a secure storage account corresponding to said account identification value.

30. A secure storage system, comprising:
a first non-volatile memory device comprising a non-volatile memory adapted to store a first memory identification value, and further adapted to limit access to a portion of said non-volatile memory utilizing a credential;

a second non-volatile memory device adapted to compute said credential utilizing said first memory identification value and an account identification value; and a host adapted to associate said credential with said portion of said non-volatile memory within said first non-volatile memory device, and adapted to utilize said credential to obtain read and write access permission to said portion of said non-volatile memory within said first non-volatile memory device;

wherein said second non-volatile memory is further adapted to compute said credential utilizing a second memory identification value stored within said second non-volatile memory device; and wherein said second non-volatile memory is further adapted to calculate the account identification value using a third memory identification value stored within said second non-volatile memory device.

31. The secure storage system of claim 30, wherein said host is further adapted to associate said account identification value with said portion of said non-volatile memory within said first non-volatile memory device, and further adapted to utilize said account identification value to obtain read and write access permission to said portion of said non-volatile memory within said first non-volatile memory device.

32. The secure storage system of claim 30, wherein said second memory identification value stored within said second non-volatile memory device is an International Mobile Subscriber Identity value.

33. The secure storage system of claim 30, wherein said second memory identification value stored within said second non-volatile memory device is a Mobile Subscriber Integrated Services Digital Network value.

34. The secure storage system of claim 30, wherein said first non-volatile memory device is a TrustedFlash device.

35. The secure storage system of claim 30, wherein said second non-volatile memory device is a Subscriber Identity Module card.

36. The secure storage system of claim 30, wherein said second non-volatile memory device is a Re-Usable Identification Module card.

37. The secure storage system of claim 30, wherein said credential is an encryption key.

38. The secure storage system of claim 30, wherein said credential is a decryption key.

39. The secure storage system of claim 30, wherein said first non-volatile memory device, said second non-volatile memory device and said host are contained within the same enclosure.

40. A host, comprising:
a first communication interface adapted to communicate with a first non-volatile memory device;
a second communication interface adapted to communicate with a second non-volatile memory device;
a processor in communication with said first communication interface and said second communication interface, and configured to perform the following steps:
reading a memory identification value from said first non-volatile memory device;
calculating an account identification value;
transmitting said memory identification value and said account identification value to said second non-volatile memory device;
receiving a credential from said second non-volatile memory device, wherein said credential is calculated utilizing said memory identification value, said account identification value, and a formula;

transmitting a command to create a secure storage account in said first non-volatile memory device, wherein said command comprises said credential and said account identification value;

wherein said second non-volatile memory device is further adapted to compute said credential utilizing a second memory identification value stored within said second non-volatile memory device, and wherein said calculating said account identification value further comprises:

reading a third memory identification value from said second non-volatile memory device; and calculating the account identification value utilizing said third memory identification value.

41. The host of claim 40, wherein said second memory identification value stored within said second non-volatile memory device is an International Mobile Subscriber Identity value.

42. The host of claim 40, wherein said second memory identification value stored within said second non-volatile memory device is a Mobile Subscriber Integrated Services Digital Network value.

43. The host of claim 40, wherein said first non-volatile memory device is a TrustedFlash device.

44. The host of claim 40, wherein said second non-volatile memory device is a Subscriber Identity Module card.

45. The host of claim 40, wherein said second non-volatile memory device is a Re-Usable Identification Module card.

46. The host of claim 40, wherein said credential is an encryption key.

47. The host of claim 40, wherein said credential is a decryption key.

48. The host of claim 40, wherein said processor is further adapted to perform the following steps:

reading said formula from said first non-volatile memory device; and storing said formula in said second non-volatile memory device.

49. The host of claim 48, wherein said formula is encrypted.

50. The host of claim 48, wherein said formula is stored in a protected partition of said first non-volatile memory device.

51. The host of claim 40, wherein said processor is further adapted to perform the following steps:

requesting said formula from a server;

receiving said formula from said server; and storing said formula in said second non-volatile memory device.

52. A host, comprising:

a first communication interface adapted to communicate with a first non-volatile memory device;

a second communication interface adapted to communicate with a second non-volatile memory device;

a processor in communication with said first communication interface and said second communication interface, and configured to perform the following steps:

reading a memory identification value from a first non-volatile memory device;

calculating an account identification value;

transmitting said memory identification value and said account identification value to a second non-volatile memory device;

receiving a credential from said second non-volatile memory device, wherein said credential is calculated utilizing said memory identification value, said account identification value, and a formula;

performing an account access sequence, wherein said account access sequence comprises transmitting a command, wherein said command comprises said account identification value and a value based on said credential;

wherein said second non-volatile memory device is further adapted to compute said credential utilizing a second memory identification value stored within said second non-volatile memory device, and wherein said calculating said account identification value further comprises:

reading a third memory identification value from said second non-volatile memory device; and calculating the account identification value utilizing said third memory identification value.

53. The host of claim 52, wherein said second memory identification value stored within said second non-volatile memory device is an International Mobile Subscriber Identity value.

54. The host of claim 52, wherein said second memory identification value stored within said second non-volatile memory device is a Mobile Subscriber Integrated Services Digital Network value.

55. The host of claim 52, wherein said first non-volatile memory device is a TrustedFlash device.

56. The host of claim 52, wherein said second non-volatile memory device is a Subscriber Identity Module card.

57. The host of claim 52, wherein said second non-volatile memory device is a Re-Usable Identification Module card.

58. The host of claim 52, wherein said credential is an encryption key.

59. The host of claim 52, wherein said credential is a decryption key.

60. The host of claim 52, wherein said processor is further adapted to perform the following steps:

reading said formula from said first non-volatile memory device; and storing said formula in said second non-volatile memory device.

61. The host of claim 60, wherein said formula is encrypted.

62. The host of claim 60, wherein said formula is stored in a protected partition of said first non-volatile memory device.

63. The host of claim 52, wherein said processor is further adapted to perform the following steps:

requesting said formula from a server;

receiving said formula from said server; and storing said formula in said second non-volatile memory device.

* * * * *